United States Patent
Hu et al.

(10) Patent No.: US 11,373,384 B2
(45) Date of Patent: Jun. 28, 2022

(54) PARAMETER CONFIGURATION METHOD, APPARATUS, AND DEVICE FOR THREE-DIMENSIONAL FACE MODEL, AND STORAGE MEDIUM

(71) Applicant: TENCENT TECHNOLOGY (SHENZHEN) COMPANY LIMITED, Shenzhen (CN)

(72) Inventors: Mu Hu, Shenzhen (CN); Sirui Gao, Shenzhen (CN); Yonggen Ling, Shenzhen (CN); Yitong Wang, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/187,219

(22) Filed: Feb. 26, 2021

(65) Prior Publication Data

US 2021/0183166 A1    Jun. 17, 2021

Related U.S. Application Data

(63) Continuation of application No. PCT/CN2019/120282, filed on Nov. 22, 2019.

(30) Foreign Application Priority Data

Nov. 30, 2018 (CN) .......................... 201811458670.2

(51) Int. Cl.
G06T 19/00 (2011.01)
G06T 19/20 (2011.01)
(Continued)

(52) U.S. Cl.
CPC ............ *G06T 19/20* (2013.01); *G06K 9/6215* (2013.01); *G06T 17/20* (2013.01); *G06V 40/161* (2022.01);
(Continued)

(58) Field of Classification Search
None
See application file for complete search history.

(56) References Cited

U.S. PATENT DOCUMENTS 8,902,232 B2 * 12/2014 Debevec ................. G06T 13/40
345/473
9,036,018 B2 * 5/2015 Wang .................. G06K 9/00315
348/77

(Continued)

FOREIGN PATENT DOCUMENTS

CN    106447785 A    2/2017
CN    106652015 A    5/2017
(Continued)

OTHER PUBLICATIONS

The World Intellectual Property Organization (WIPO) International Search Report for PCT/CN2019/120282 dated Feb. 25, 2020 5 Pages (including translation).
(Continued)

*Primary Examiner* — Martin Mushambo
(74) *Attorney, Agent, or Firm* — Anova Law Group, PLLC

(57) ABSTRACT

This application provides a method for configuring parameters of a three-dimensional face model. The method includes: obtaining a reference face image; identifying a key facial point on the reference face image to obtain key point coordinates as reference coordinates; and determining a recommended parameter set in a face parameter value space according to the reference coordinates. The first projected
(Continued)

coordinates are projected coordinates of the key facial point obtained by projecting a three-dimensional face model corresponding to the recommended parameter set onto a coordinate system. The proximity of the first projected coordinates to the reference coordinates meets a preset condition.

20 Claims, 9 Drawing Sheets

(51) Int. Cl.
  *G06K 9/62* (2022.01)
  *G06T 17/20* (2006.01)
  *G06V 40/16* (2022.01)

(52) U.S. Cl.
  CPC .... *G06V 40/171* (2022.01); *G06T 2219/2004* (2013.01)

(56) References Cited

U.S. PATENT DOCUMENTS

| | | | |
|---|---|---|---|
| 2010/0134487 A1* | 6/2010 | Lai | G06T 17/00 345/419 |
| 2018/0189553 A1* | 7/2018 | Guo | G06K 9/00281 |

FOREIGN PATENT DOCUMENTS

| | | |
|---|---|---|
| CN | 108171789 A | 6/2018 |
| CN | 108765551 A | 11/2018 |
| CN | 109598749 A | 4/2019 |

OTHER PUBLICATIONS

V. Lepetit et al., "EPnP: An Accurate O(n) Solution to the PnP Problem," International Journal of Computer Vision, 2009, vol. 81, Issue 2, p. 155-166. 12 pages.

* cited by examiner

PARAMETER CONFIGURATION METHOD, APPARATUS, AND DEVICE FOR THREE-DIMENSIONAL FACE MODEL, AND STORAGE MEDIUM

CROSS-REFERENCES TO RELATED APPLICATIONS

This application claims priority to PCT Application No. PCT/CN2019/120282, filed on Nov. 22, 2019, which claims priority to Chinese Patent Application No. 201811458670.2, entitled "PARAMETER CONFIGURATION METHOD, APPARATUS, AND DEVICE FOR THREE-DIMENSIONAL FACE MODEL, AND MEDIUM" and filed on Nov. 30, 2018. The two applications are incorporated herein by reference in their entirety.

FIELD OF THE TECHNOLOGY

This application relates to the field of computer technologies, and in particular, to a method for configuring parameters of a three-dimensional face model, an apparatus and device for configuring a three-dimensional face model, and a related storage medium.

BACKGROUND OF THE DISCLOSURE

To provide user experience with a strong immersion feeling, many applications provide a user with a face customization function by using a face customization system, for the user to create a virtual character appearance with which the user is satisfied. Face customization is to perform a do-it-yourself (DIY) data operation on a virtual character appearance.

For example, an online game application provides a face customization function for a user. The user customizes a virtual appearance of a virtual character with which the user is satisfied by configuring parameters of a three-dimensional face model, that is, the user performs DIY on a virtual character appearance, to create a DIY virtual character appearance with which the user is satisfied, thereby providing more game fun and providing the user with a game immersion feeling.

SUMMARY

Embodiments of this application provide a method for configuring parameters of a three-dimensional face model, an apparatus and device for configuring a three-dimensional face model, and a related storage medium, which can resolve the problem that in actual operations, it is difficult for a user to quickly configure a face similar to that of a specified person in a customization method.

An aspect provides a method for configuring parameters of a three-dimensional face model, the method being applicable to a computing device and including: obtaining a reference face image; identifying a key facial point on the reference face image to obtain key point coordinates as reference coordinates; and determining a recommended parameter set of face parameters in a face parameter value space according to the reference coordinates, the recommended parameter set being used for configuring parameters of a three-dimensional face model. The first projected coordinates are projected coordinates of the key facial point obtained by projecting the three-dimensional face model corresponding to the recommended parameter set onto a coordinate system in which the reference coordinates are located, and proximity of the first projected coordinates to the reference coordinates meets a preset condition.

Another aspect provides a method for configuring parameters of a three-dimensional face model, the method being applicable to a terminal and including: transmitting a request to obtain parameter to a server, the request to obtain parameter carrying a reference face image receiving a recommended parameter set returned, according to the request to obtain parameter, by the server, the recommended parameter set being used for configuring parameters of a three-dimensional face model, the recommended coordinates being projected coordinates of a key facial point obtained by projecting the three-dimensional face model corresponding to the recommended parameter set onto a coordinate system in which reference coordinates are located, the reference coordinates being key point coordinates corresponding to a key facial point detected on the reference face image, proximity of the recommended coordinates to the reference coordinates meeting a preset condition; and displaying the recommended parameter set of face parameters.

Another aspect provides an apparatus for configuring parameters of a three-dimensional face model, including an obtaining module, configured to obtain a reference face image; a detection module, configured to identify a key facial point on the reference face image to obtain key point coordinates as reference coordinates; and a determining module, configured to determine a recommended parameter set of face parameters in a face parameter value space according to the reference coordinates, the recommended parameter set being used for configuring parameters of a three-dimensional face model; wherein first projected coordinates are projected coordinates of the key facial point obtained by projecting the three-dimensional face model corresponding to the recommended parameter set onto a coordinate system in which the reference coordinates are located, and proximity of the first projected coordinates to the reference coordinates meets a preset condition.

This application provides a method for configuring parameters of a three-dimensional face model. In some embodiments of the present disclosure, an image including face features of a specified person is used as a reference face image. Key point coordinates obtained by identifying a key facial point on the reference face image is used as reference coordinates. Then a recommended parameter set of face customization parameters is determined in a face parameter value space according to the reference coordinates. First projected coordinates are projected coordinates of the key facial point obtained by projecting a three-dimensional face model corresponding to the recommended parameter set onto a coordinate system in which the reference coordinates are located. The proximity of the first projected coordinates to the reference coordinates meets a preset condition. Therefore, the recommended parameter set of face parameters is used for configuring parameter(s) of the three-dimensional face model to construct a virtual appearance similar to that of the specified person. In some embodiments of the present disclosure, the recommended parameter set of face parameters is provided based on the reference face image. Therefore, a user does not need to constantly adjust values of face parameters according to a subjective judgment of the user, and can configuring parameter(s) of a three-dimensional face model through simple operations, thereby reducing the operation difficulty of the user, and improving the configuration efficiency of the three-dimensional face model.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

Figure 1:
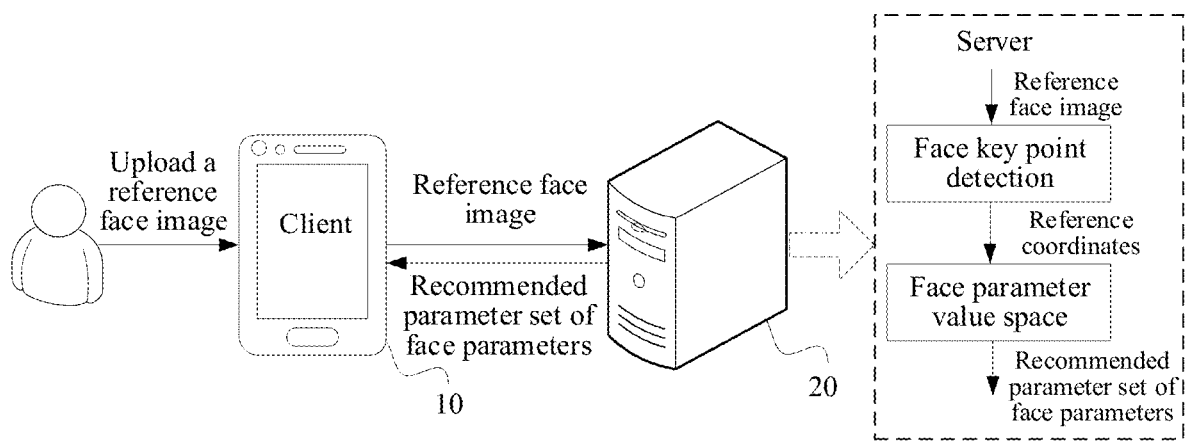
FIG. 1 is an architectural diagram of a method for configuring parameters of a three-dimensional face model according to an embodiment of this application.

The embodiments of this application provide a node classification method and apparatus and a model training method and apparatus. For a large-scale atlas, training may be performed merely based on a portion of nodes. A portion of nodes in the atlas are calculated iteratively each time without traversing each node in the atlas, thereby greatly reducing computing overheads and saving computing resources.

In the specification, claims, and accompanying drawings of this application, the terms "first", "second", "third", "fourth", and so on (if existing) are intended to distinguish between similar objects rather than describe a specific order or sequence. It is to be understood that data used in this way is interchangeable in a suitable case, so that the embodiments of this application described herein can be implemented in a sequence in addition to the sequence shown or described herein. Moreover, the terms "include", "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Often an application provides a manual value assignment method for a user. The application first provides a default value of each face parameter for the user. The user manually selects a value according to a judgment of the user to reassign the value to the face parameter. The application generates a face model according to values selected by the user for face parameters, that is, generate a virtual appearance. For example, with reference to an appearance of a specified person, such as, the appearance of the user or the appearance of a celebrity whom the user favors, the user usually intends to customize a virtual appearance similar to that of the specified person.

Using the manual value assignment method provided, the user needs to constantly adjust values of face parameters according to a subjective judgment of the user, and may customize the final virtual appearance only after a plurality of manual operation tries. In addition, to improve the diversity of the face customization effect, the application may generally provide various face parameters for the user. Consequently, it is difficult for the user to quickly configure a face similar to that of the specified person in an operation.

In a face customization system, a user needs to constantly adjust values of face parameters according to a subjective judgment of the user to configuring parameter(s) of a three-dimensional face model. The operation difficulty of the user is increased, and it is difficult for the user to quickly configure a face similar to that of a specified person. This application provides a method for configuring parameters of a three-dimensional face model. In embodiments of the present disclosure, an image including face features of a specified person is used as a reference face image. Key point coordinates are obtained by identifying a key facial point on the reference face image. The key point coordinates are used as reference coordinates. Then a recommended parameter set of face customization parameters is determined in a face parameter value space according to the reference coordinates. Projected coordinates of the key facial point, that is, first projected coordinates, may be obtained by projecting a three-dimensional face model corresponding to the recommended parameter set of the face customization parameters onto a coordinate system in which the reference coordinates are located. The proximity of the first projected coordinates to the reference coordinates meets a preset condition. Therefore, the recommended parameter set of face parameters is used for configuring parameter(s) of the three-dimensional face model to construct a virtual appearance similar to that of the specified person.

It can be seen that in the embodiments of the present disclosure, the recommended parameter set of face parameters is provided based on the reference face image. Therefore, a user does not need to constantly adjust values of face parameters according to a subjective judgment of the user, and can configuring parameter(s) of a three-dimensional face model through simple operations, thereby reducing the operation difficulty of the user, and improving the configuration efficiency of the three-dimensional face model. The user therefore can quickly configure a face similar to that of a specified person, improving user experience.

The method for configuring parameters of a three-dimensional face model provided in this application is applicable to a computing device (e.g., a server) or a terminal. The server is a computing device configured to provide a service for configuring parameters of a three-dimensional face model, and may be an independent server, or may be a server cluster including a plurality of servers. The terminal may be any user equipment that is available at present, being researched and developed, or to be researched and developed in future, and that can interact with a server through connection of a wired and/or wireless network in any form. The terminal includes, but is not limited to, a smartphone, a feature phone, a tablet computer, a laptop personal computer, and a desktop personal computer that are available at present, being researched and developed, or to be researched and developed in future. The wired and/or wireless network includes, but is not limited to, a Wireless-Fidelity (Wi-Fi) network, a local area network (LAN), a cellular network, and a coaxial cable.

The method may be alternatively performed by the terminal and the server collaboratively, and is stored in the terminal or the server in the form of an application program. The terminal or the server implements the method for configuring parameters of a three-dimensional face model by performing the foregoing application program. The application program may be developed based on a client/server (C/S) structure. A terminal on which a client is stalled implements the method for configuring parameters of a three-dimensional face model through interaction between the client and the server. Certainly, in some cases, such as in a web game scenario, the application program may be alternatively developed based on a browser/server (B/S) structure. The terminal implements the method for configuring parameters of a three-dimensional face model through interaction between a browser and the server.

To make the technical solutions of this application clearer and more understandable, the following describes the method for configuring parameters of a three-dimensional face model in this application with reference to an actual scenario. Referring to an architectural diagram of a scenario of the method for configuring parameters of a three-dimensional face model shown in FIG. 1, a terminal 10 and a server 20 are included in the scenario. A client is installed on the terminal 10. The server 20 stores an application program corresponding to the method for configuring parameters of a three-dimensional face model.

In some embodiments, the client on the terminal 10 provides an upload control. A user may upload, based on the upload control, a picture of the user or of a celebrity or a character that the user favors as a reference face image. The server 20 obtains the reference face image from the terminal 10. Key point coordinates are obtained by identifying a key facial point on the reference face image. The key point coordinates are used as reference coordinates. Then a recommended parameter set of face parameters is determined in a face parameter value space according to the reference coordinates. The server 20 returns the recommended parameter set of face parameters to the terminal 10. The terminal 10 displays the recommended parameter set. The terminal 10 may further display first projected coordinates of the recommended parameter set in a coordinate system in which the reference coordinates are located. The user may configure parameters for a three-dimensional face model based on the recommended parameter set of face parameters that is obtained by the terminal 10, to customize a face similar to that in the reference face image uploaded by the user.

Next, the method for configuring parameters of a three-dimensional face model provided in the embodiments of this application is described from the perspective of a server. Referring to a flowchart of the method for configuring parameters of a three-dimensional face model shown in FIG. 2, the method is applicable to a server and includes the following steps:

201: Obtain a reference face image.

The reference face image refers to a face image. The reference face image includes a target face. The target face refers to a face that a user expects to customize, and may be a real face, such as a face of the user or a face of a public figure such as a celebrity, or may be a virtual face, such as a face of a virtual character in literary and artistic works such as an animation. In this embodiment of this application, the server configures parameters for a three-dimensional face model based on the target face in the reference face image, to configure a face similar to the target face.

In some embodiments, the server may obtain, in response to a request to obtain parameter transmitted by the terminal, the reference face image from the request to obtain parameter, to perform configuring parameter(s) of the three-dimensional face model.

202: Detect a key facial point on the reference face image to obtain key point coordinates as reference coordinates.

As an example, the server may recognize the reference face image by using a pre-trained neural network model, cut the face part therein, and then detect the key facial point by using another trained neural network model for key facial point detection to obtain a set of key point coordinates marked as landmarks_2d. The quantity of key facial points may be defined according to different requirements, for example, the quantity may be 234, 68, or 168.

203: Determine a recommended parameter set of face parameters in a face parameter value space according to the reference coordinates.

The recommended parameter set of face parameters is used for configuring parameters of a three-dimensional face model. The three-dimensional face model corresponding to the recommended parameter set of face parameters is projected onto a coordinate system in which the reference coordinates are located, to obtain first projected coordinates, proximity of the first projected coordinates to the reference coordinates meeting a preset condition. It can be understood that higher proximity of the first projected coordinates to the reference coordinates indicates higher similarity of a face customized during the configuring parameter(s) of the three-dimensional face model by using the recommended parameter set of face parameters to the target face.

In this embodiment, the proximity of the projected coordinates to the reference coordinates may be represented by a distance between the projected coordinates and the reference coordinates. The distance between the projected coordinates and the reference coordinates indicates a modulus value of a vector difference between the projected coordinates and the reference coordinates. In some embodiments, differences between projected coordinates for key facial points and the reference coordinates may be calculated. A sum of squares of the differences is then calculated. Then extraction of square root is performed to obtain distances between the projected coordinates and the reference coordinates. For example, the proximity of the first projected coordinates to the reference coordinates may be represented by the distance between the two calculated through the foregoing process.

The projected coordinates may be obtained by projecting the three-dimensional face model onto the coordinate system in which the reference coordinates are located. In some embodiments, the server may determine a conversion parameter according to a key facial point coordinates of a reference three-dimensional face model and the reference coordinates; and project, for any value combination according to the conversion parameter, a three-dimensional face model corresponding to the value combination onto the coordinate system in which the reference coordinates are located to obtain projected coordinates of the key facial point. For example, the first projected coordinates are projected coordinates obtained by projecting, according to the conversion parameter, a three-dimensional face model corresponding to the recommended parameter set onto the coordinate system in which the reference coordinates are located.

In this embodiment, the reference three-dimensional face model refers to a three-dimensional face model in which all face parameters are initial default parameters. The initial default parameters may be averages of face parameters in different three-dimensional face models. In some embodiments, key facial points may be manually marked in the reference three-dimensional face model. The key facial points on the two-dimensional reference face image correspond to point locations in the reference three-dimensional face model. Therefore, the server may determine the conversion parameter according to the reference three-dimensional face model and the reference coordinates in combination with a pose estimation algorithm. The conversion parameter may include a rotation angle R and a scaling coefficient A. The rotation angle R includes rotation angles of at least three dimensions, which can be represented by using a matrix, and therefore may be also referred to as a rotation matrix R. The pose estimation algorithm may include a perspective-n-point (PnP) algorithm or a bundle adjustment (BA) algorithm.

It can be understood that for any value of any face parameter, the server maintains a difference matrix corresponding to the value. For any value combination, a difference matrix corresponding to each value in the value combination and the reference three-dimensional face model are superimposed, to obtain a three-dimensional face model corresponding to the value combination. Next, the three-dimensional face model corresponding to the value combination is rotated according to the rotation matrix R, is scaled according to the scaling coefficient A, and then is projected onto the coordinate system of the reference coordinates, for example, an X-Y plane, to obtain the projected coordinates of the key facial point.

As an example, the foregoing any value combination includes a recommended parameter set. The server performs superimposition on the reference three-dimensional face model and a difference matrix corresponding to each value in the recommended parameter set, to obtain a three-dimensional face model corresponding to the recommended parameter set. The three-dimensional face model corresponding to the recommended parameter set is rotated according to the rotation matrix R, is scaled according to the scaling coefficient A, and then is projected onto the coordinate system of the reference coordinates, for example, an X-Y plane, to obtain the first projected coordinates of the key facial point.

The preset condition may be that the distance between the projected coordinates and the reference coordinates is less than a preset distance, or the distance between the projected coordinates and the reference coordinates tends to be in a convergence state. Based on the above, the server may determine, by traversing the face parameter value space, parameter values which enable the distance between the projected coordinates and the reference coordinates to be less than the preset distance or to tend to be in the convergence state, and use the parameter values as the recommended parameter set of face parameters for configuring parameter(s) of the three-dimensional face model, to configure a face satisfying requirements of the user.

The face parameter value space refers to a preset value set of face parameters in a server. The face parameter value space includes face parameters. The face parameters are face parameters required for configuring parameter(s) of the three-dimensional face model.

It can be seen from the above that this embodiment of this application provides a method for configuring parameters of a three-dimensional face model. In some embodiments of the present disclosure, an image including face features of a specified person is used as a reference face image. Key point coordinates are obtained by identifying a key facial point on the reference face image. The key point coordinates are used as reference coordinates. Then a recommended parameter set of face customization parameters is determined in a face parameter value space according to the reference coordinates. First projected coordinates are obtained by projecting a three-dimensional face model corresponding to the recommended parameter set of the face customization parameters onto a coordinate system in which the reference coordinates are located. The proximity of the first projected coordinates to the reference coordinates meets a preset condition. Therefore, the recommended parameter set of face parameters is used for configuring parameter(s) of the three-dimensional face model to construct a virtual appearance similar to that of the specified person. It can be seen that in some embodiments of the present disclosure, the recommended parameter set of face parameters is provided based on the reference face image. Therefore, a user does not need to constantly adjust values of face parameters according to a subjective judgment of the user, and can configuring parameter(s) of a three-dimensional face model through simple operations, thereby reducing the operation difficulty of the user, and improving the configuration efficiency of the three-dimensional face model.

Figure 2:
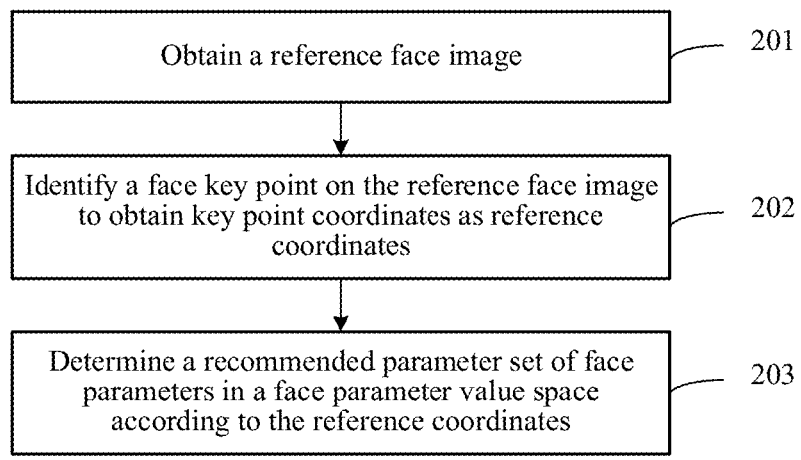
FIG. 2 is a flowchart of a method for configuring parameters of a three-dimensional face model according to an embodiment of this application.

In the embodiment shown in FIG. 2, there are two implementations of determining the recommended parameter set of face parameters by the server. The first implementation is to group face parameters in the face parameter value space to obtain a plurality of parameter groups, determine a recommended value combination of each parameter group separately, and determine the recommended parameter set of face parameters based on a plurality of recommended value combinations. The second implementation is to determine, based on a value space corresponding to each face parameter, a plurality of value combinations of the face parameter in the value space, determine projected coordinates corresponding to each value combination, and further determine a distance between the projected coordinates and the reference coordinates, to determine the recommended parameter set of face parameters. The following describes the two implementations.

Figure 3:
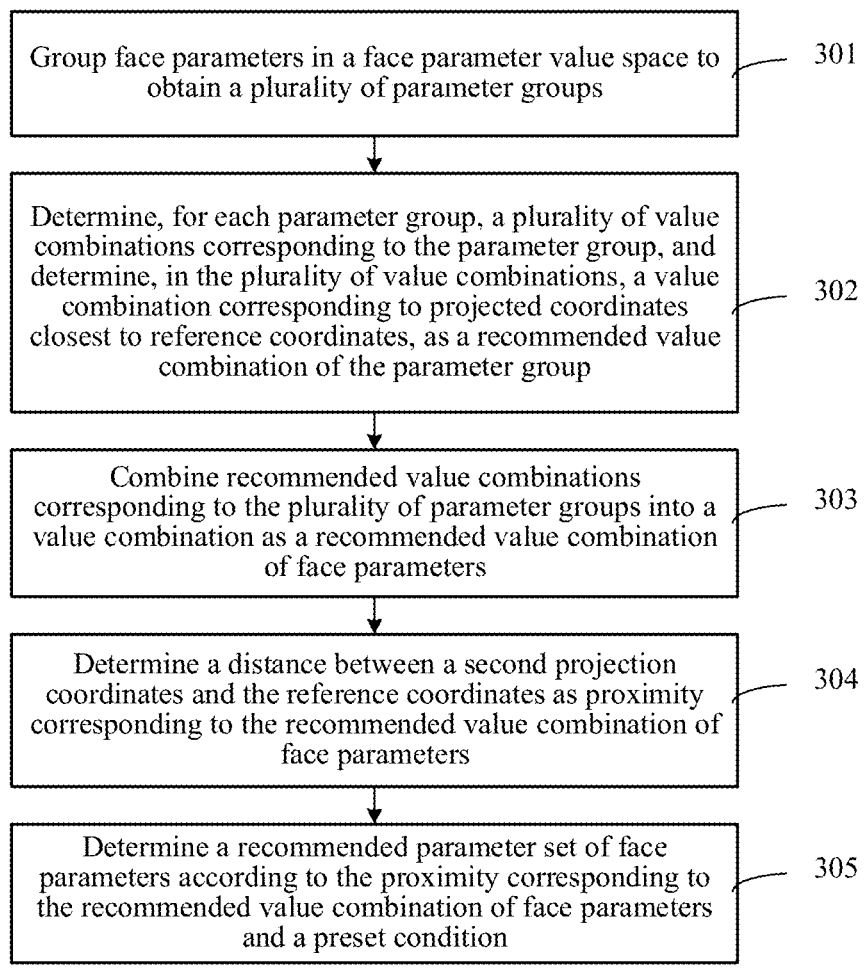
FIG. 3 is a flowchart of a method for configuring parameters of a three-dimensional face model according to an embodiment of this application.

Referring to a flowchart of a method for configuring parameters of a three-dimensional face model shown in FIG. 3, this embodiment is an improvement on the embodiment shown in FIG. 2. This embodiment is only described on the difference from the embodiment shown in FIG. 2. The method includes the following steps:

301: Group face parameters in the face parameter value space to obtain a plurality of parameter groups.

In this embodiment, the server groups the face parameters in the face parameter value space to obtain the plurality of parameter groups, and determines a corresponding recommended parameter set according to the parameter group, thereby reducing the complexity of calculation. For convenience of understanding, description is made by using an example. If there are a total of 15 face parameters and 3 values for each type of the face parameters, there are $3^{15}$ determined value combinations by traversing value spaces of all the face parameters without grouping. However, if the 15 face parameters are divided into 5 groups in the grouping in this embodiment, each parameter group including 3 parameters, for each parameter group, only a corresponding value space needs to be traversed. There are $3^3$ value combinations in each parameter group. Then there are a total of $3^3*5$ value combinations by traversing all face parameters based on grouping. For each value combination, corresponding calculation needs to be performed, and the same calculation amount needs to be consumed. It can be seen that, compared with the case without grouping, the grouping provided in this embodiment can greatly reduce the calculation amount.

It can be understood that degrees to which different face parameters affect the three-dimensional face model are different. For example, degrees to which face parameters such as an eye-to-eye distance, an eye length, a mouth length, and an angle of a mouth corner affect the three-dimensional face model are higher, while degrees to which an angle of an eyelid and the like affect the three-dimensional face model are lower. Grouping based on degrees to which the face parameters affect the three-dimensional face model is beneficial to targeted adjustment on the three-dimensional face model. In addition, there is further correlation between some face parameters. When the face parameters are grouped, the grouping may be performed based on the correlation between the face parameters. Face parameters with correlation or with relatively strong correlation are divided into the same parameter group. Face parameters without correlation or with relatively weak correlation are divided into different groups. Therefore, the parameter groups do not interfere with one another. Based on the above, in some possible implementations, the server may group all the face parameters according to degrees to which the face parameters affect the three-dimensional face model and correlation between the face parameters, to obtain the plurality of parameter groups.

In some embodiments, the embodiments of this application further provide an example of grouping all the face parameters according to degrees to which the face parameters affect the three-dimensional face model and correlation between the face parameters. In this example, the server divides the face parameters into the plurality of parameter groups according to correlation between the face parameters and a specified face region, to obtain the plurality of parameter groups, one of the parameter groups including at least one parameter belonging to a corresponding specified face region. The specified face region includes at least one of a cheek, eyes, eyebrows, a mouth, and a nose. As an example, the server may divide the face parameters according to a specified face region, and divide face parameters relevant to the specified face region into one parameter group. That is, the server divides the face parameters into a plurality of parameter groups according to regions such as a cheek, eyes, eyebrows, a mouth, and a nose to which the face parameters belong. One parameter group includes at least one parameter belonging to one specified face region. In an example, there are a total of 34 face parameters, referring to Table 1:

TABLE 1

Face parameter details

| Serial No. | Specified face region | Face Parameter |
| --- | --- | --- |
| 1 | Eyes | Eye position |
| 2 | Eyes | Eye tilt |
| 3 | Eyes | Eye spacing |
| 4 | Eyes | Eye scaling |
| 5 | Eyes | Pupil size |
| 6 | Eyes | Pupil position |
| 7 | Eyes | Upper eyelid height |
| 8 | Eyes | Lower eyelid height |
| 9 | Eyes | Outer eye corner tilt |
| 10 | Eyes | Inner eye corner tilt |
| 11 | Eyebrows | Eyebrow tilt |
| 12 | Eyebrows | Eyebrow height |
| 13 | Mouth | Upper lip width |
| 14 | Mouth | Lower lip width |
| 15 | Mouth | Upper lip position |
| 16 | Mouth | Lower lip position |
| 17 | Mouth | Left mouth corner height |
| 18 | Mouth | Right mouth corner height |
| 19 | Nose | Nose size |
| 20 | Nose | Nose position |
| 21 | Nose | Nose tip curvature |
| 22 | Nose | Overall height |
| 23 | Nose | Nose tip height |
| 24 | Nose | Nasal wing width |
| 25 | Nose | Nose bridge width |
| 26 | Nose | Nose bridge height |
| 27 | Cheek | Cheekbone position |
| 28 | Cheek | Upper face width |
| 29 | Cheek | Lower face width |
| 30 | Cheek | Chin width |
| 31 | Cheek | Chin position |
| 32 | Cheek | Chin tip length |
| 33 | Cheek | Chin protrusion |
| 34 | Cheek | Plump face |

In some embodiments, division is first performed according to a face region to which a face parameter belongs. Therefore, parameters can be divided into 5 groups, which are (1 to 10), (11 and 12), (13 to 18), (19 to 26), and (27 to 34). For the same face region, division is then performed according to correlation between the face parameters. Therefore, the parameter group (1 to 10) is divided into 3 parameter groups (1 to 4), (5 and 6), and (7 to 10), the parameter group (13 to 18) is divided into 3 parameter groups (13 and 14), (15 and 16), and (17 and 18), the parameter group (19 to 26) is divided into 4 parameter groups (19 and 20), (21 and 22), (23 and 24), and (25 and 26), and the parameter group (27 to 34) is divided into 4 parameter groups (27 to 29), (30 and 31), (32 and 33), and (34). Therefore, the 34 face parameters are divided into a total of 15 parameter groups.

In the foregoing example, numbers 1 to 34 represent serial numbers of the face parameters and can be replaced with face parameters corresponding to the serial numbers with reference to Table 1.

302: Determine, for each parameter group, a plurality of value combinations corresponding to the parameter group, and determine, in the plurality of value combinations, a value combination corresponding to projected coordinates closest to the reference coordinates, as a recommended value combination of the parameter group.

In this embodiment, the server determines, for each parameter group, a recommended value combination corresponding to the parameter group separately, to obtain recommended value combinations of face parameters corresponding to the plurality of parameter groups. The recommended value combination corresponding to the parameter group is a value combination corresponding to projected coordinates closest to the reference coordinates among the plurality of value combinations corresponding to the parameter group.

Based on the above, the server needs to calculate, for each parameter group and for each value combination of the parameter group, a distance between projected coordinates corresponding to the value combination and the reference coordinates separately and then determines a value combination corresponding to a minimum distance as a recommended value combination of the parameter group.

303: Combine recommended value combinations corresponding to the plurality of parameter groups into a value combination as a recommended value combination of face parameters.

In this embodiment, the server combines respective recommended value combinations of the plurality of parameter groups into a value combination to obtain the recommended value combination of face parameters. The combination in this embodiment refers to adding, to a new dimension of a recommended value combination of a parameter group, recommended value combinations of other parameter groups. For example, if respective recommended value combinations of parameter groups A, B, and C are (A1, A2, and A3), (B1, B2, and B3), and (C1, C2, and C3), a recommended value combination of combining the respective recommended value combinations of A, B, and C is (A1, A2, A3, B1, B2, B3, C1, C2, and C3). The recommended value combination is the recommended value combination of face parameters.

304: Determine a distance between a second projected coordinates and the reference coordinates as proximity corresponding to the recommended value combination of face parameters.

The second projected coordinates are projected coordinates corresponding to the recommended value combination of face parameters. For the recommended value combination of face parameters, the server may determine a three-dimensional face model corresponding to the recommended value combination according to a difference matrix corresponding to each value in the recommended value combination and the reference three-dimensional face model. In addition, the server may determine, according to key points of the reference three-dimensional face model and the reference coordinates, a conversion parameter including a rotation matrix R and a scaling coefficient A. Therefore, the server may rotate and scale the three-dimensional face model corresponding to the recommended value combination according to the rotation matrix R and the scaling coefficient A, and then project the rotated and scaled three-dimensional face model onto the coordinate system of the reference coordinates, such as an X-Y plane, to obtain the projected coordinates corresponding to the recommended value combination of face parameters, that is, the second projected coordinates.

Next, the server calculates a modulus value of a vector difference between the second projected coordinates and the reference coordinates as the distance between the projected coordinates and the reference coordinates. The distance may represent the proximity corresponding to the recommended value combination of face parameters. The proximity corresponding to the recommended value combination of face parameters refers to the proximity of the projected coordinates of the key facial point to the reference coordinates, the projected coordinates being obtained by projecting the three-dimensional face model corresponding to the recommended value combination of face parameters onto the coordinate system of the reference coordinates.

305: Determine a recommended parameter set of face parameters according to the proximity corresponding to the recommended value combination of face parameters and the preset condition.

In some embodiments, if the proximity corresponding to the recommended value combination of face parameters meets the preset condition, the recommended value combination of face parameters is determined as the recommended parameter set of face parameters, and values of face parameters in the recommended parameter set are determined as recommended values of the face parameters; and if the proximity corresponding to the recommended value combination of face parameters does not meet the preset condition, it indicates that there is still optimization room for the face parameters, and the face parameters can be further optimized.

It can be seen from the above that this embodiment of this application provides a method for configuring parameters of a three-dimensional face model. The method is to group face parameters to obtain a plurality of parameter groups, determine, in a plurality of value combinations corresponding to each parameter group, a value combination corresponding to projected coordinates closest to reference coordinates, as a recommended value combination of the parameter group, and then combine recommended value combinations of the parameter groups to obtain a recommended value combination of face parameters. If a distance between projected coordinates corresponding to the recommended value combination and the reference coordinates meets a preset condition, the recommended value combination can be determined as the recommended parameter set of face parameters. In some embodiments of the present disclosure, the face parameters are divided into the parameter groups, a corresponding recommended value combination is determined for each group individually, and then the recommended value combinations of the groups are combined to obtain the recommended value combination of face parameters, thereby greatly reducing the calculation amount of determining the recommended value combinations, shortening the time of determining the recommended value combinations, further shortening the time of determining the recommended parameter set of face parameters, and improving the configuration efficiency of the three-dimensional face model.

Figure 4:
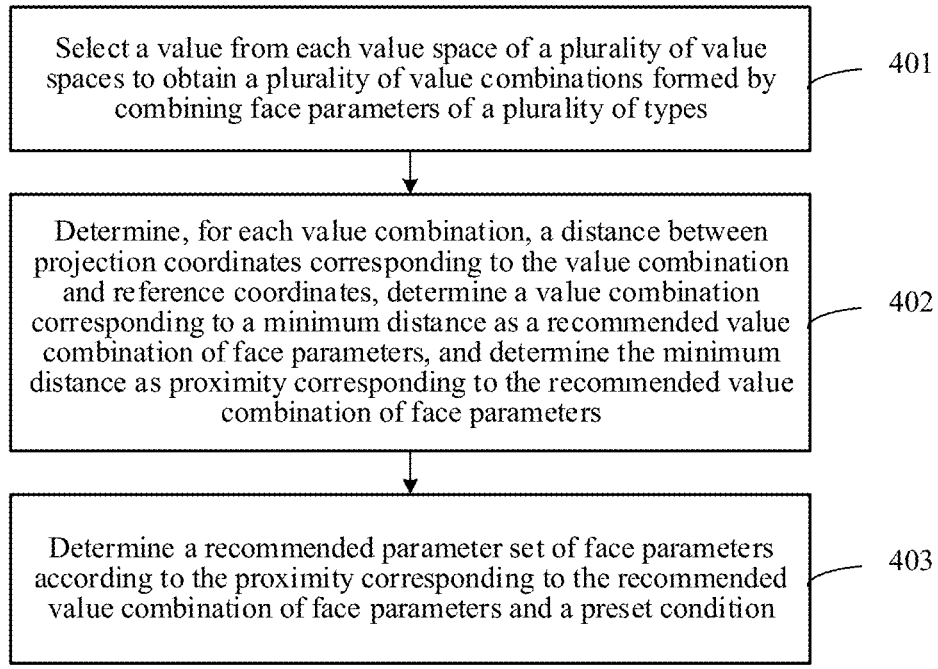
FIG. 4 is a flowchart of a method for configuring parameters of a three-dimensional face model according to an embodiment of this application.

Referring to a flowchart of a method for configuring parameters of a three-dimensional face model shown in FIG. 4, this embodiment is obtained by improving the embodiment shown in FIG. 2 and describes mainly how to determine the recommended parameter set of face parameters in response to that the face parameters are not grouped. The method includes the following steps:

401: Select a value from each value space of a plurality of value spaces to obtain a plurality of value combinations formed by combining face parameters of a plurality of types.

One type of face parameters is stored into one value space correspondingly. For each face parameter, the server may individually select any value from each of value spaces respectively corresponding to the plurality of types of face parameters for combination to obtain the plurality of value combinations of the face parameters. One of the value combinations includes face parameters of each type. When a value of any parameter in a value combination is changed, a new value combination is formed. Based on the above, a plurality of value combinations of all the face parameters can be determined.

402: Determine, for each value combination, a distance between projected coordinates corresponding to the value combination and the reference coordinates, determine a value combination corresponding to a minimum distance as a recommended value combination of face parameters, and determine the minimum distance as proximity corresponding to the recommended value combination of face parameters.

For each value combination, the server may separately determine projected coordinates corresponding to the value combination and calculate the distance between the projected coordinates and the reference coordinates. The value combination corresponding to the minimum distance, that is, a value combination corresponding to the projected coordinates closest to the reference coordinates may be determined as the recommended value combination of face parameters. A shorter distance between the projected coordinates and the reference coordinates indicates higher proximity of the projected coordinates to the reference coordinates. Based on the above, the server may use the distance between the projected coordinates corresponding to the recommended value combination of face parameters and the reference coordinates, that is, the minimum distance, as the proximity corresponding to the recommended value combination of face parameters.

Reference may be made to the foregoing relevant content description for the implementation of determining the projected coordinates corresponding to the value combination. Details are not repeated herein.

403: Determine a recommended parameter set of face parameters according to the proximity corresponding to the recommended value combination of face parameters and the preset condition.

The implementation of the step is the same as that of 305. Reference may be made to the relevant content description in 305. Details are not repeated herein.

It can be seen from the above that this embodiment provides a face parameter configuration method The method is to determine, according to value spaces respectively corresponding to face parameters, a plurality of value combinations of all the face parameters, then determine, in the plurality of value combinations, a value combination corresponding to projected coordinates closest to the reference coordinates, as a recommended value combination of face parameters, and determine the distance between the projected coordinates of the recommended value combination and the reference coordinates as proximity corresponding to the recommended value combination of face parameters; and determine, if the proximity meets a preset condition, a recommended parameter set of face parameters according to the recommended value combination. The method provides the recommended value combination based on the distance between the projected coordinates of each value combination and the reference coordinates, and provides the recommended parameter set of face parameters based on the recommended value combination. A user may directly configure face parameters according to the recommended parameter set without constantly adjusting values of the face parameters according to a subjective judgment of the user, thereby reducing the operation difficulty of the user, and improving the configuration efficiency of a three-dimensional face model.

In the embodiments shown in FIG. 3 and FIG. 4, regardless of whether the face parameters are grouped, the recommended value combination of face parameters and the proximity of the projected coordinates corresponding to the recommended value combination to the reference coordinates need to be determined. The recommended parameter set of face parameters is determined according to the proximity corresponding to the recommended value combination of face parameters and the preset condition.

Based on different preset conditions, there may be a plurality of implementations of determining the recommended parameter set of face parameters.

In some embodiments, the server may determine whether the proximity corresponding to the recommended value combination of face parameters is less than a preset proximity threshold, and if yes, determine the recommended value combination of face parameters as the recommended parameter set of face parameters. The preset proximity threshold is a preset threshold which represents proximity of projected coordinates to reference coordinates and which can be set according to an empirical value.

In some embodiments, the server may determine whether the proximity corresponding to the recommended value combination of face parameters is in a convergence state; and if yes, it indicates that the proximity corresponding to the recommended value combination of face parameters tends to be stable, and there is little room for optimization. The server may determine the recommended value combination of face parameters as the recommended parameter set of face parameters.

If the proximity corresponding to the recommended value combination is not less than the preset proximity threshold, and the proximity corresponding to the recommended value combination of face parameters is not in a convergence state, the server may further update the reference three-dimensional face model according to the recommended value combination of face parameters, and then return to perform, based on a conversion parameter redetermined according to the updated reference three-dimensional face model and the reference coordinates, the step of determining the recommended value combination of face parameters.

In some embodiments, the server may perform superimposition on a difference matrix corresponding to a value of each face parameter in the recommended value combination and the reference three-dimensional face model to update the reference three-dimensional face model. Then, the server may determine the conversion parameter according to key facial points of the updated reference three-dimensional face model and the reference coordinates. Next, the server may re-perform, based on the conversion parameter, the step of determining the recommended value combination of face parameters. As an example, for each value combination, the server determines, according to the conversion parameter determined according to the updated reference three-dimensional face model, projected coordinates corresponding to the value combination, then calculates a distance between the projected coordinates and the reference coordinates, and determines a value combination corresponding to a minimum distance as the recommended value combination. When the value combination is a value combination of the parameter groups, recommended value combinations of the parameter groups may be further combined to obtain the recommended value combination of face parameters. Therefore, the server may further determine the recommended parameter set of face parameters based on the recommended value combination.

It can be understood that the method for configuring parameters of a three-dimensional face model provided in this embodiment of this application is applicable to a game application. After determining the recommended parameter set of face parameters, the server may generate a virtual face model according to the recommended parameter set of face parameters. The virtual face model may be used as a virtual character appearance of a user.

Figure 5:
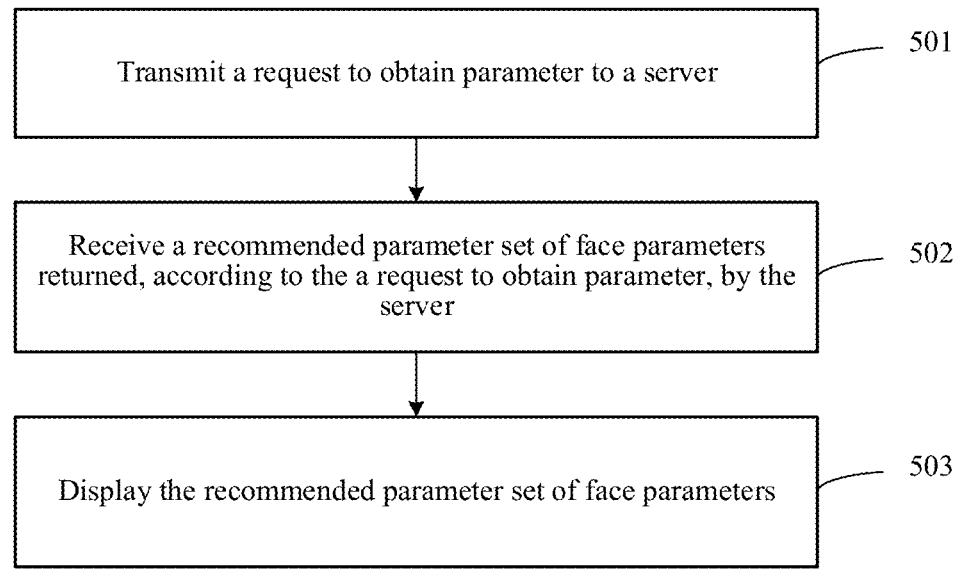
FIG. 5 is a flowchart of a method for configuring parameters of a three-dimensional face model according to an embodiment of this application.

The method for configuring parameters of a three-dimensional face model provided in the embodiments of this application is described from the perspective of a terminal. Referring to a flowchart of the method for configuring parameters of a three-dimensional face model shown in FIG. 5, the method is applicable to a terminal and includes the following steps:

501: Transmit a request to obtain parameter to a server.

The terminal transmits the request to obtain parameter to the server, the request to obtain parameter being used for requesting for a recommended parameter set of face parameters, the recommended parameter set being used for configuring parameters of a three-dimensional face model. The request to obtain parameter carries a reference face image, for the server to provide a corresponding recommended parameter set of face parameters according to the reference face image, so that a user can configure parameters according to the recommended parameter set of face parameters, and further configure a virtual face model similar to a face in the reference face image.

In this embodiment, the terminal may transmit the request to obtain parameter to the server in response to a face customization operation triggered by the user. In some embodiments, the terminal may display a virtual character configuration interface. The interface carries a face customization control. The user may trigger the face customization control by clicking/tapping, touching, speech controlling, or the like, and upload the reference face image. The terminal obtains the reference face image in response to the face customization operation triggered through the face customization control by the user, generates the request to obtain parameter according to information including the reference face image, and transmits the request to obtain parameter to the server.

502: Receive a recommended parameter set of face parameters returned, according to the request to obtain parameter, by the server.

The terminal receives the recommended parameter set of face parameters returned by the server. First recommended coordinates are projected coordinates of a key facial point obtained by projecting a three-dimensional face model corresponding to the recommended parameter set onto a coordinate system in which reference coordinates are located. The reference coordinates are key point coordinates corresponding to a key facial point detected on the reference face image. Proximity of the first recommended coordinates to the reference coordinates meets a preset condition. That is, the projected coordinates are relatively close to the reference coordinates. Therefore, the three-dimensional face model corresponding to the recommended parameter set of face parameters is similar to the face in the reference face image.

The recommended parameter set of face customization parameters is determined by the server according to the reference face image. The server obtains the reference face image, detects key point coordinates on the reference face image to obtain a key facial point as the reference coordinates, and then determines the recommended parameter set of face parameters in a face parameter value space according to the reference coordinates. Reference may be made to the foregoing relevant content description for the determining process. Details are not repeated herein.

503: Display the recommended parameter set of face parameters.

In this embodiment of this application, the terminal displays the recommended parameter set of face parameters, for the user to configure parameters for the three-dimensional face model according to the recommended parameter set of face parameters. The user may directly configure parameters for the three-dimensional face model by using the recommended parameter set of face parameters as parameter values of the face parameters; or finely adjust the recommended parameter set of face parameters according to specific requirements, and configure parameters for the three-dimensional face model by using adjusted values as parameter values of the face parameters.

The terminal may further correspondingly display first projected coordinates of the recommended parameter set in a coordinate system in which the reference coordinates are located.

In some possible implementations, the terminal may display the recommended parameter set of face parameters on the virtual character configuration interface. The virtual character configuration interface further displays an adjustment control corresponding to the face parameters. Therefore, the user may directly use the recommended parameter set of face parameters as parameter values of the face parameters, or finely adjust parameter values of the face parameters through the adjustment control.

It can be seen from the above that this embodiment of this application provides a method for configuring parameters of a three-dimensional face model. In some embodiments of the present disclosure, a terminal transmits a request to obtain parameter to a server, the request to obtain parameter carrying a reference face image. Therefore, the server can provide a corresponding recommended parameter set of face parameters according to the reference face image. Then the terminal receives the recommended parameter set of face parameters returned by the server, and displays the recommended parameter set of face parameters. Therefore, a user can configure parameters for a three-dimensional face model according to the recommended parameter set of face parameters to quickly configure a virtual face model similar to a face in the reference face image without constantly adjusting values of face parameters according to a subjective judgment of the user, thereby reducing the operation difficulty of the user, and improving the configuration efficiency of the three-dimensional face model.

Figure 6:
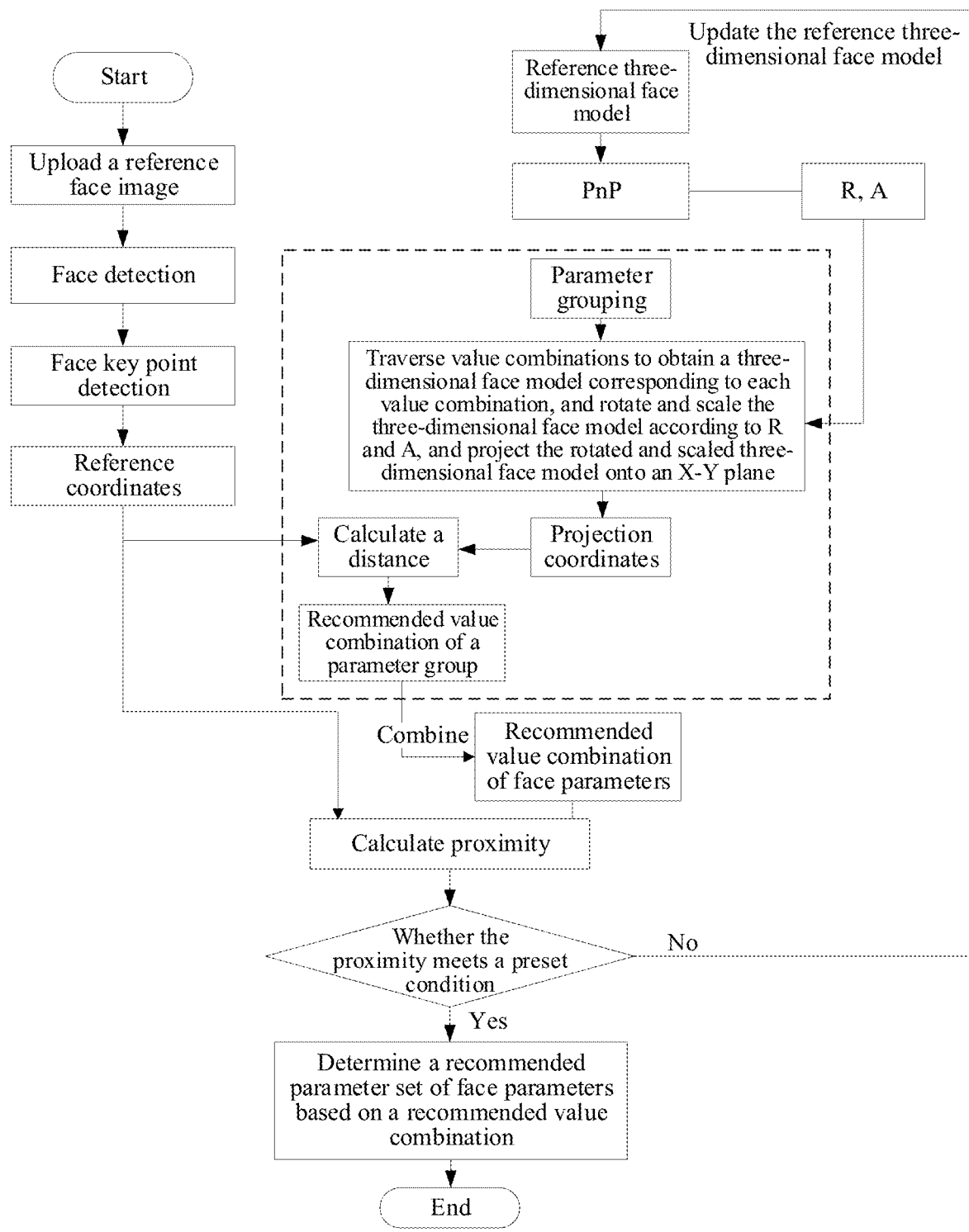
FIG. 6 is a flowchart of a method for configuring parameters of a three-dimensional face model in a game application scenario according to an embodiment of this application.

To make the technical solutions of this application more understandable, the following describes the method for configuring parameters of a three-dimensional face model provided in the embodiments of this application in a game application scenario. Referring to a flowchart of a method for configuring parameters of a three-dimensional face model in the application scenario shown in FIG. 6 and a hardware structure diagram of a method for configuring parameters of a three-dimensional face model in the application scenario shown in FIG. 7, the application scenario is described by using an example in which a terminal 10 interacts with a server 20 to configuring parameter(s) of a three-dimensional face model.

In the application scenario, a game client is installed on the terminal 10. The game client provides a virtual character configuration interface. The virtual character configuration interface carries a face customization control. Reference may be made to a schematic interface diagram shown by 110 in FIG. 7. A user uploads an image including a face of the user or a face of a public figure or of a person in an artistic work through the face customization control as a reference face image, as shown by 120 in FIG. 7. The terminal 10 obtains the reference face image in response to a face customization operation triggered by the user, generates a request to obtain parameter according to information including the reference face image, and transmits the request to obtain parameter to the server.

Figure 7:
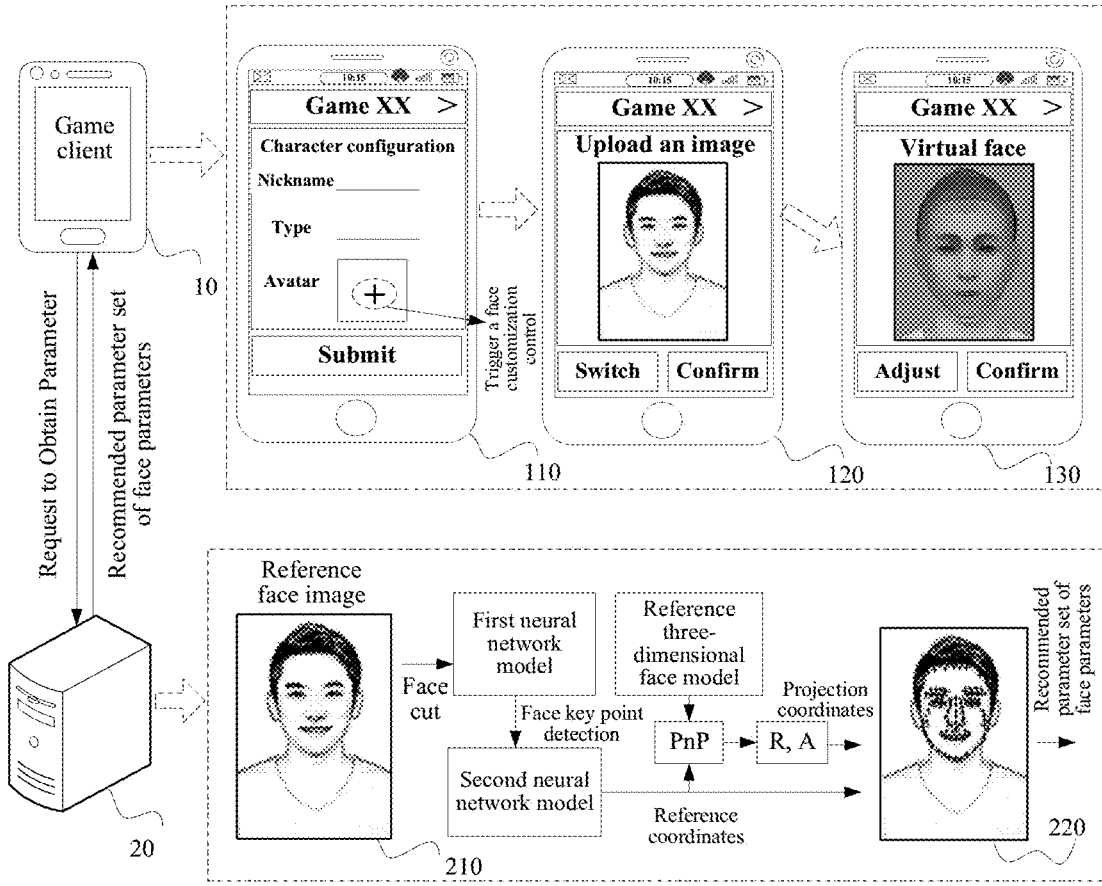
FIG. 7 is a hardware structure diagram of a method for configuring parameters of a three-dimensional face model in a game application scenario according to an embodiment of this application.

The server 20 receives the request to obtain parameter transmitted by the terminal 10, and obtains the reference face image from the request to obtain parameter, as shown by 210 in FIG. 7, then performs face detection by using a pre-trained first neural network model, cuts a face part in the reference face image, and then detects a key facial point by using a trained second neural network model for key facial point detection to obtain key point coordinates as reference coordinates. The server may determine a conversion parameter according to key points of a reference three-dimensional face model and the reference coordinates in combination with a pose estimation algorithm such as a PnP algorithm. The conversion parameter includes a rotation matrix R and a scaling coefficient A.

When receiving the request to obtain parameter, the server 20 further groups all face parameters according to degrees to which the face parameters affect the three-dimensional face model and correlation between the face parameters, to obtain a plurality of parameter groups, then separately determines, for each parameter group, a plurality of value combinations corresponding to the parameter group, traverses the plurality of value combinations corresponding to the parameter group, and superimposes a difference matrix corresponding to each value in the value combination onto the reference three-dimensional face model to obtain a three-dimensional face model corresponding to the value combination.

Therefore, the server 20 may rotate and scale the three-dimensional face model corresponding to the value combination according to the rotation matrix R and the scaling coefficient A, and then project the rotated and scaled three-dimensional face model onto a coordinate system of the reference coordinates, that is, an X-Y plane, to obtain projected coordinates of each key facial point in the three-dimensional face model corresponding to the value combination. 220 in FIG. 7 shows the projected coordinates and the reference coordinates of each key facial point. In this embodiment, points with different grayscales are used to distinguish the reference coordinates from the projected coordinates. For each parameter group, the server may calculate a distance between projected coordinates corresponding to each value combination and the reference coordinates separately, determine a value combination corresponding to a minimum distance, that is, a value combination in which points with different grayscales are closest in 220, as a recommended value combination of the parameter group, and then combine recommended value combinations of all the parameter groups to obtain a recommended value combination of face parameters.

The server 20 superimposes a difference matrix corresponding to each value in the recommended value combination of face parameters onto the reference three-dimensional face model to obtain a three-dimensional face model corresponding to the recommended value combination, then rotates and scales the three-dimensional face model according to the rotation matrix R and the scaling coefficient A, and projects the rotated and scaled three-dimensional face model onto the X-Y plane to obtain projected coordinates corresponding to the recommended value combination of face parameters. Next, the server 20 calculates the distance between the projected coordinates corresponding to the recommended value combination including all parameters and the reference coordinates as proximity of the projected coordinates to the reference coordinates, and determines values in the recommended value combination as a recommended parameter set of face parameters if the proximity meets a preset condition; otherwise, updates the reference three-dimensional face model according to the recommended value combination, recalculates the conversion parameter according to the updated reference three-dimensional face model, and re-perform, according to the conversion parameter, the step of determining the recommended value combination to obtain the recommended parameter set of face parameters, thereby ending the process of determining the recommended parameter set of face parameters.

The terminal 10 receives the recommended parameter set of face parameters returned by the server 20, and displays the recommended parameter set of face parameters. The user may directly use the recommended parameter set of face parameters as parameter values of the face parameters; or performs fine adjustment based on the recommended parameter set of face parameters, and uses finely adjusted values as parameter values of the face parameters, to implement face parameter configuration. Then, the terminal 10 obtains parameter values of the face parameters configured by the user, and uploads the parameter values to the server 20. The server 20 customizes a virtual face model according to the parameter values of the face parameters, and returns the virtual face model to the terminal 10. The terminal 10 may display the virtual face model, for the user to determine whether the virtual face model meets requirements of the user. If yes, the user can set the virtual face model as an avatar of a virtual character.

The above is an implementation of a method for configuring parameters of a three-dimensional face model provided in the embodiments of this application. Based on the above, the embodiments of this application further provide a corresponding parameter configuration apparatus for a three-dimensional face model. The apparatus provided in the embodiments of this application is described in the following from the perspective of function modularization.

Figure 8:
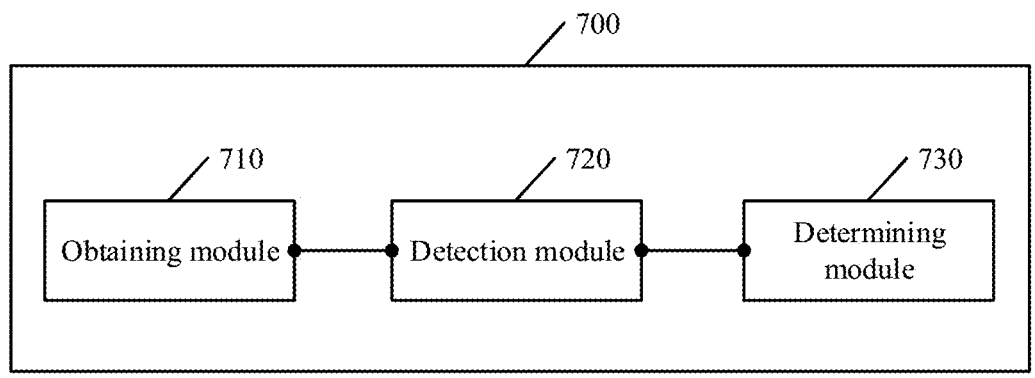
FIG. 8 is a schematic structural diagram of an apparatus for configuring parameters of a three-dimensional face model according to an embodiment of this application.

Referring to a schematic structural diagram of an apparatus for configuring parameters of a three-dimensional face model shown in FIG. 8, the parameter configuration apparatus 700 for a three-dimensional face model includes:

an obtaining module 710, configured to obtain a reference face image;

a detection module 720, configured to detect a key facial point on the reference face image to obtain key point coordinates as reference coordinates; and a determining module 730, configured to determine a recommended parameter set of face parameters in a face parameter value space according to the reference coordinates, the recommended parameter set being used for configuring parameters of a three-dimensional face model, first projected coordinates being projected coordinates of the key facial point obtained by projecting the three-dimensional face model corresponding to the recommended parameter set onto a coordinate system in which the reference coordinates are located, proximity of the first projected coordinates to the reference coordinates meeting a preset condition.

Figure 9:
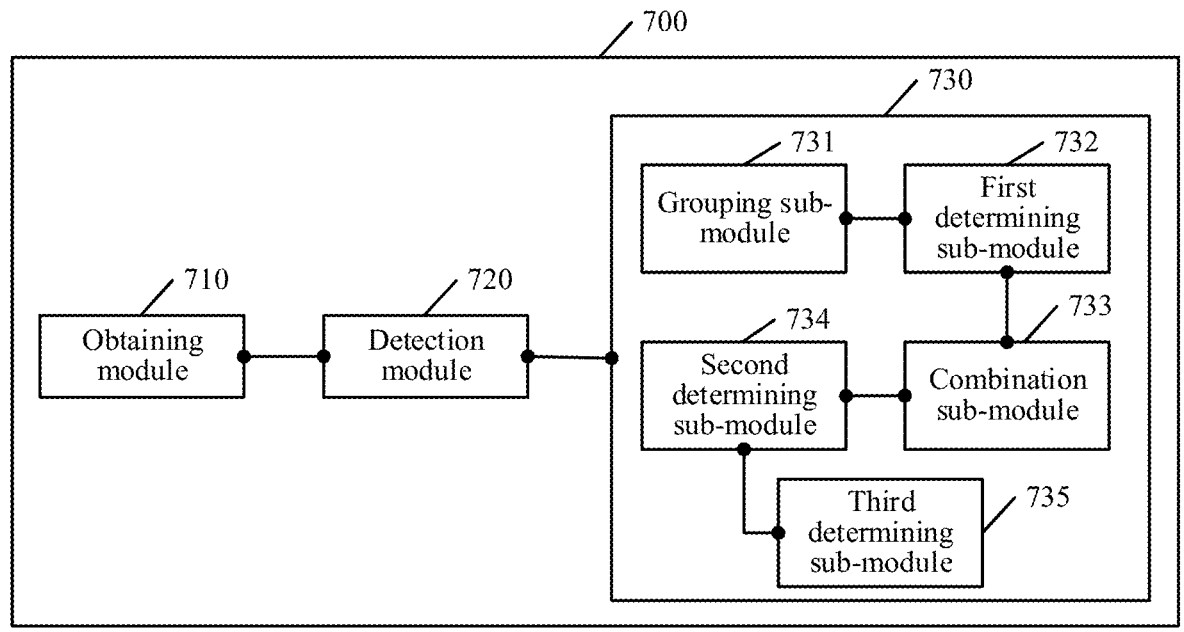
FIG. 9 is a schematic structural diagram of an apparatus for configuring parameters of a three-dimensional face model according to an embodiment of this application.

In some embodiments, referring to FIG. 9, FIG. 9 is a schematic structural diagram of an apparatus for configuring parameters of a three-dimensional face model according to an embodiment of this application. Based on the structure shown in FIG. 8, the determining module 730 includes:

a grouping sub-module 731, configured to group face parameters in the face parameter value space to obtain a plurality of parameter groups;

a first determining sub-module 732, configured to determine, for each parameter group, a plurality of value combinations corresponding to the parameter group, and determine, in the plurality of value combinations, a value combination corresponding to projected coordinates closest to the reference coordinates, as a recommended value combination of the parameter group;

a combination sub-module 733, configured to combine a plurality of recommended value combinations corresponding to the plurality of parameter groups into a value combination as a recommended value combination of face parameters;

a second determining sub-module 734, configured to determine a distance between a second projected coordinates and the reference coordinates as proximity corresponding to the recommended value combination of face parameters, the second projected coordinates being projected coordinates corresponding to the recommended value combination of face parameters; and a third determining sub-module 735, configured to determine the recommended parameter set according to the proximity corresponding to the recommended value combination of face parameters and the preset condition.

In some embodiments, the grouping sub-module 731 is configured to group the face parameters according to degrees to which the face parameters affect the three-dimensional face model and correlation between the face parameters, to obtain the plurality of parameter groups.

In some embodiments, the grouping sub-module 731 is configured to divide the face parameter into the plurality of parameter groups according to correlation between the face parameters and a specified face region, one of the parameter groups including at least one parameter belonging to a corresponding specified face region, the specified face region including at least one of a cheek, eyes, eyebrows, a mouth, and a nose.

Figure 10:
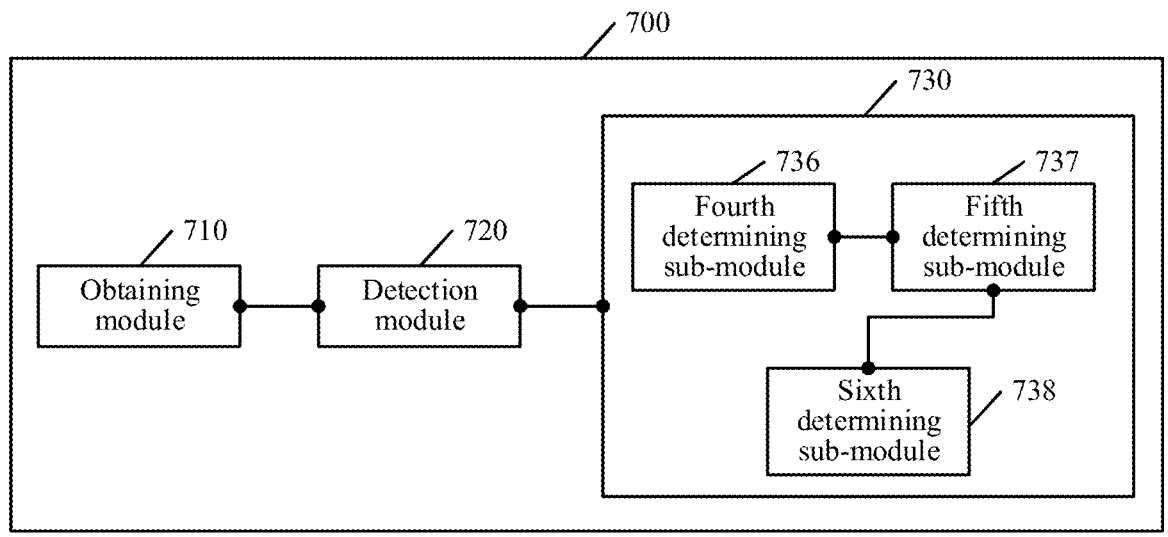
FIG. 10 is a schematic structural diagram of an apparatus for configuring parameters of a three-dimensional face model according to an embodiment of this application.

In some embodiments, referring to FIG. 10, FIG. 10 is a schematic structural diagram of an apparatus for configuring parameters of a three-dimensional face model according to an embodiment of this application. Based on the structure shown in FIG. 8, the determining module 730 includes:

a fourth determining sub-module 736, configured to select a value from each value space of a plurality of value spaces to obtain a plurality of value combinations formed by combining face parameters of a plurality of types, one type of face parameters being stored into one value space correspondingly;

a fifth determining sub-module 737, configured to determine, for each value combination, a distance between projected coordinates corresponding to the value combination and the reference coordinates, determine a value combination corresponding to a minimum distance as a recommended value combination of face parameters, and determine the minimum distance as proximity corresponding to the recommended value combination of face parameters; and a sixth determining sub-module 738, configured to determine the recommended parameter set of face parameters according to the proximity corresponding to the recommended value combination of face parameters and the preset condition.

In some embodiments, during the determining of the distance between the projected coordinates and the reference coordinates, the second determining sub-module 734 or the fifth determining sub-module 737 is further configured to:

determine a conversion parameter according to a key facial point coordinates of a reference three-dimensional face model and the reference coordinates;

project, for any value combination according to the conversion parameter, a three-dimensional face model corresponding to the value combination onto the coordinate system in which the reference coordinates are located to obtain a second projected coordinates; and determine a modulus value of a vector difference between the second projected coordinates and the reference coordinates as the distance between the second projected coordinates and the reference coordinates.

In some embodiments, during the determining of the recommended parameter set of face parameters according to the proximity corresponding to the recommended value combination of face parameters and the preset condition, the third determining sub-module 735 or the sixth determining sub-module 738 is further configured to:

determine whether the proximity corresponding to the recommended value combination of face parameters is less than a preset proximity threshold, and determine the recommended value combination of face parameters as the recommended parameter set in response to that the proximity corresponding to the recommended value combination of face parameters is less than the preset proximity threshold; or determine whether the proximity corresponding to the recommended value combination of face parameters is in a convergence state, and determine the recommended value combination of face parameters as the recommended parameter set in response to that the proximity corresponding to the recommended value combination of face parameters is in the convergence state.

In some embodiments, during the determining of the recommended parameter set of face parameters according to the proximity corresponding to the recommended value combination of face parameters and the preset condition, the third determining sub-module 735 or the sixth determining sub-module 738 is further configured to:

update the reference three-dimensional face model according to the recommended value combination of face parameters in response to that the proximity corresponding to the recommended value combination of face parameters is neither less than the preset proximity threshold nor in the convergence state, and then return to perform, based on a conversion parameter redetermined according to the updated reference three-dimensional face model and the reference coordinates, the operation of determining the recommended value combination of face parameters.

Figure 11:
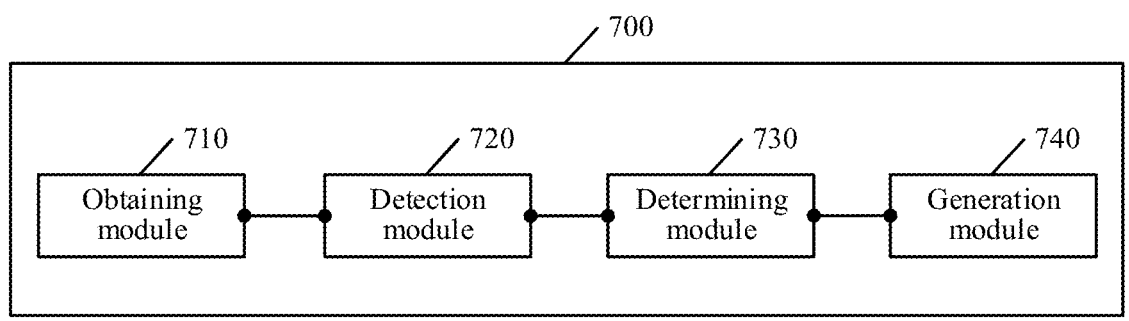
FIG. 11 is a schematic structural diagram of an apparatus for configuring parameters of a three-dimensional face model according to an embodiment of this application.

In some embodiments, referring to FIG. 11, FIG. 11 is a schematic structural diagram of an apparatus for configuring parameters of a three-dimensional face model according to an embodiment of this application. Based on the structure shown in FIG. 8, the apparatus 700 further includes:

a generation module 740, configured to generate a virtual face model according to the recommended parameter set, and determine the virtual face model as a virtual character appearance of a user.

Figure 12:
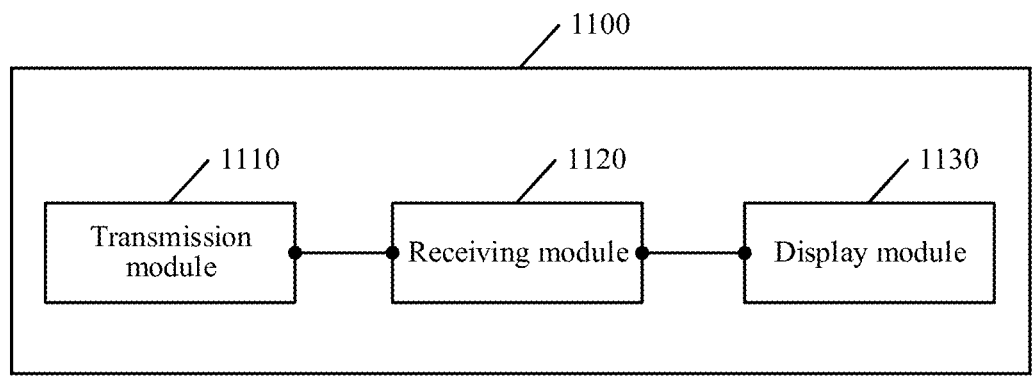
FIG. 12 is a schematic structural diagram of an apparatus for configuring parameters of a three-dimensional face model according to an embodiment of this application.

Referring to a schematic structural diagram of an apparatus for configuring parameters of a three-dimensional face model shown in FIG. 12, the apparatus 1100 includes:

a transmission module 1110, configured to transmit a request to obtain parameter to a server, the request to obtain parameter carrying a reference face image;

a receiving module 1120, configured to receive a recommended parameter set returned, according to the request to obtain parameter, by the server, the recommended parameter set being used for configuring parameters of a three-dimensional face model, first recommended coordinates being projected coordinates of a key facial point obtained by projecting the three-dimensional face model corresponding to the recommended parameter set onto a coordinate system in which reference coordinates are located, the reference coordinates being key point coordinates corresponding to a key facial point detected on the reference face image, proximity of the first recommended coordinates to the reference coordinates meeting a preset condition; and a display module 1130, configured to display the recommended parameter set of face parameters.

In some embodiments, the display module 1130 is configured to display the recommended parameter set of face parameters on a virtual character configuration interface, the virtual character configuration interface further displaying an adjustment control corresponding to the face parameters.

Figure 13:
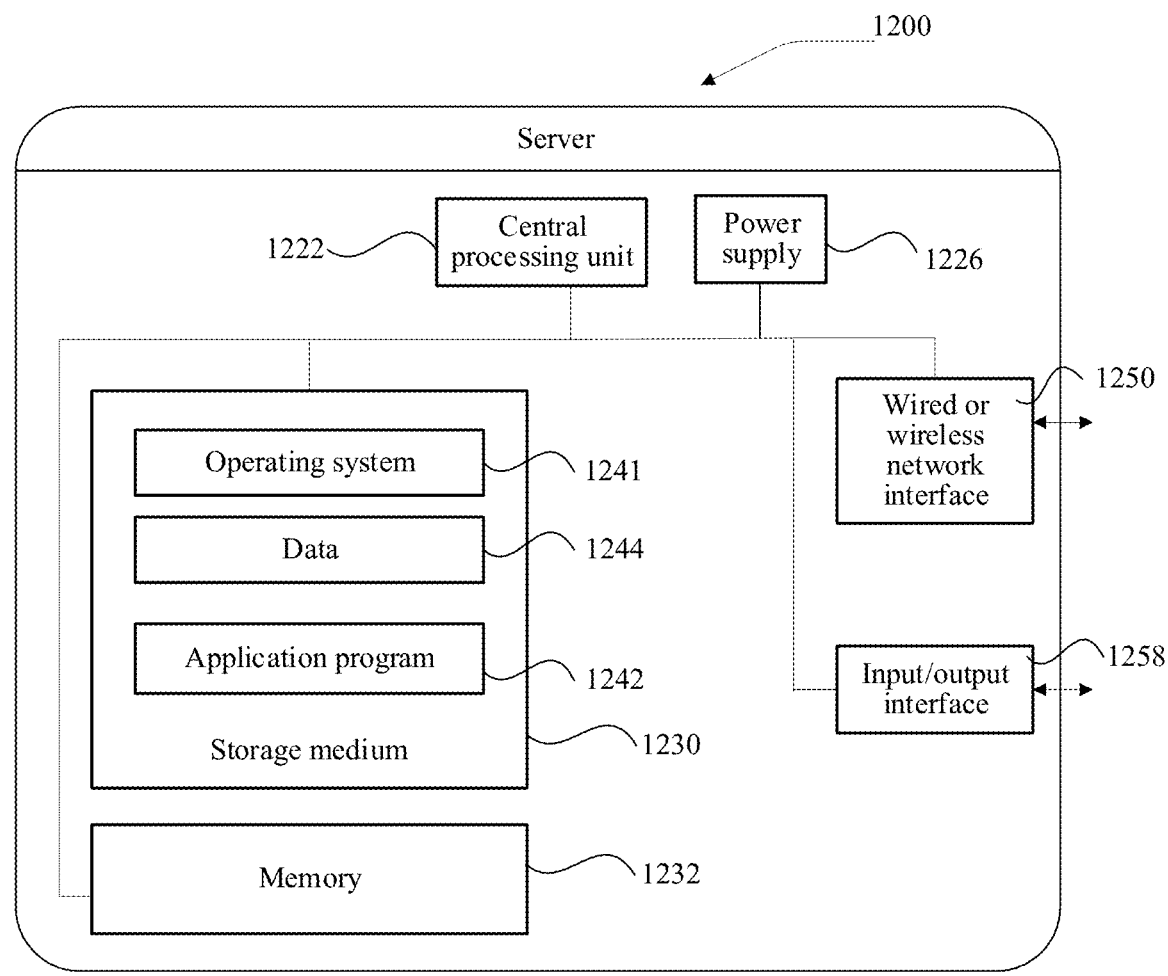
FIG. 13 is a schematic structural diagram of a device for configuring parameters of a three-dimensional face model according to an embodiment of this application.

This application further provides a device for configuring parameters of a three-dimensional face model. The device may be a server. Referring to FIG. 13, FIG. 13 is a schematic structural diagram of a server for configuring parameters of a three-dimensional face model according to an embodiment of this application. The server 1200 greatly differs due to different configurations or performances. The server may include one or more central processing units (CPUs) 1222 (for example, one or more processors), a memory 1232, and one or more storage media 1230 (for example, one or more mass storage devices) for storing an application program 1242 or data 1244. The memory 1232 and the storage medium 1230 may be transient or persistent storages. A program stored in the storage medium 1230 may include one or more modules (which are not marked in the figure), and each module may include a series of instruction operations on the server. Further, the central processing units 1222 may be configured to communicate with the storage media 1230, and perform on the server 1200 a series of instruction operations stored in the storage media 1230.

The server 1200 may further include one or more power supplies 1226, one or more wired or wireless network interfaces 1250, one or more input/output interfaces 1258, and/or one or more operating systems 1241 such as Windows Server™, Mac OS X™, Unix™, Linux™, or FreeBSD™.

The steps performed by the server in the foregoing embodiment may be based on the server structure shown in FIG. 13.

The CPU 1222 is configured to perform the following steps:

obtaining a reference face image;

identifying a key facial point on the reference face image to obtain key point coordinates as reference coordinates; and determining a recommended parameter set of face parameters in a face parameter value space according to the reference coordinates, the recommended parameter set being used for configuring parameters of a three-dimensional face model;

first projected coordinates being projected coordinates of the key facial point obtained by projecting the three-dimensional face model corresponding to the recommended parameter set onto a coordinate system in which the reference coordinates are located, proximity of the first projected coordinates to the reference coordinates meeting a preset condition.

In some embodiments, the CPU 1222 may further perform method steps of any implementation of the method for configuring parameters of a three-dimensional face model in the embodiments of this application.

Figure 14:
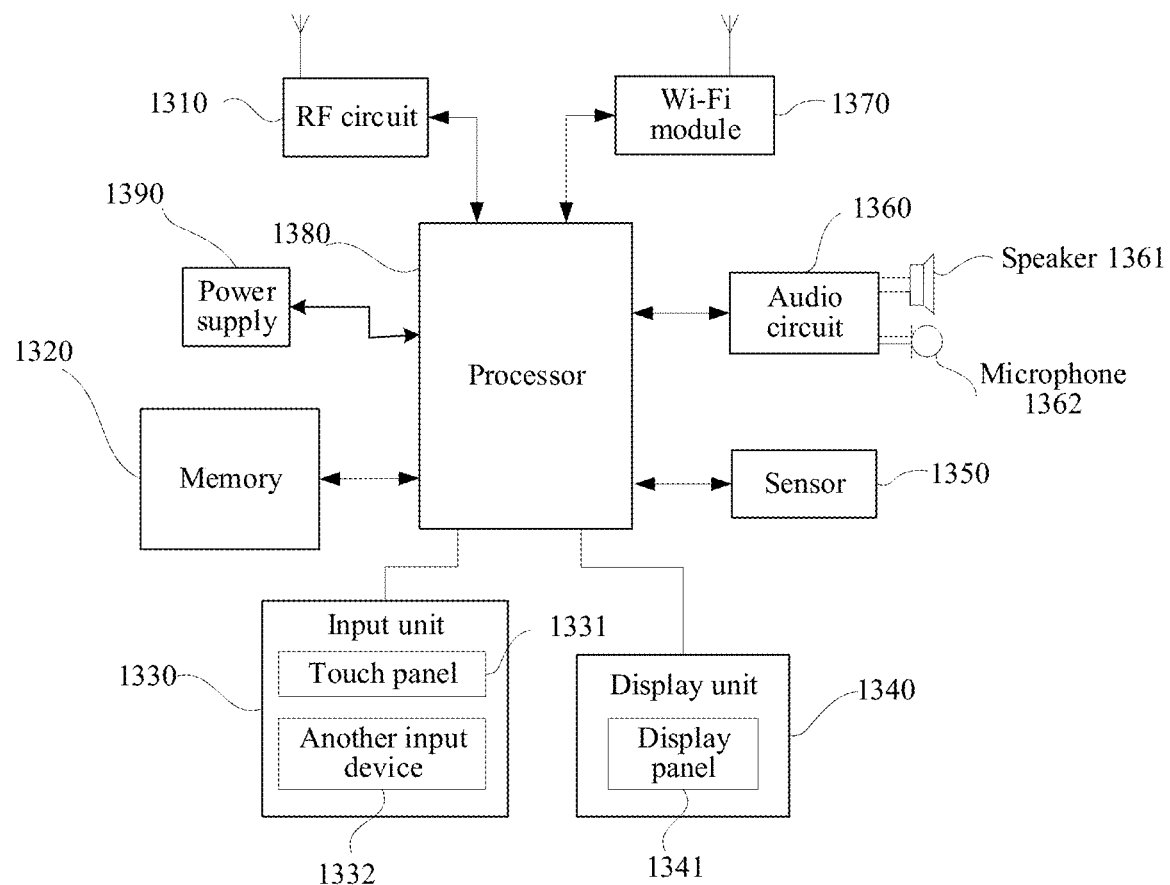
FIG. 14 is a schematic structural diagram of a device for configuring parameters of a three-dimensional face model according to an embodiment of this application.

An embodiment of this application further provides another parameter configuration device for a three-dimensional face model. The device may be a terminal device. As shown in FIG. 14, for ease of description, only parts related to the embodiments of this application are shown. For specific technical details that are not disclosed, refer to the method part in the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 14 is a block diagram of a structure of a part of a mobile phone related to a terminal according to an embodiment of this application. Referring to FIG. 14, the mobile phone includes components such as: a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure of the mobile phone shown in FIG. 14 does not constitute a limitation on the mobile phone, and the mobile phone may include more components or fewer components than those shown in the figure, or some components may be combined, or a different component deployment may be used.

The following makes a specific description of components of the mobile phone with reference to FIG. 14.

The RF circuit 1310 may be configured to receive and send signals during an information receiving and sending process or a call process. Specifically, the RF circuit 1310 receives downlink information from a base station, then delivers the downlink information to the processor 1380 for processing, and sends designed uplink data to the base station. Generally, the RF circuit 1310 includes, but is not limited to, an antenna, at least one amplifier, a transceiver, a coupler, a low noise amplifier (LNA), a duplexer, and the like. In addition, the RF circuit 1310 may also communicate with a network and another device through wireless communication. The wireless communication may use any communication standard or protocol, including, but not limited to a global system of mobile communication (GSM), a general packet radio service (GPRS), code division multiple access (CDMA), wideband code division multiple access (WCDMA), Long Term Evolution (LTE), an email, a short messaging service (SMS), and the like.

The memory 1320 may be configured to store a software program and module. The processor 1380 runs the software program and module stored in the memory 1320, to implement various functional applications and data processing of the mobile phone. The memory 1320 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1320 may include a high-speed random access memory, and may alternatively include a non-volatile memory, such as at least one magnetic disk storage device, a flash memory, or another volatile solid-state storage device.

The input unit 1330 may be configured to receive input digit or character information, and generate a keyboard signal input related to the user setting and function control of the mobile phone. Specifically, the input unit 1330 may include a touch panel 1331 and another input device 1332. The touch panel 1331 is also referred to as a touchscreen, may collect a touch operation that is performed by a user on or near the touch panel 1331 (for example, an operation that is performed by a user by using any appropriate object or accessory such as a finger or a stylus on or near the touch panel 1331), and drive a corresponding connection apparatus according to a preset program. In some embodiments, the touch panel 1331 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1380. Moreover, the touch controller can receive and execute a command sent from the processor 1380. In addition, the touch panel 1331 may be implemented by using various types, such as a resistive type, a capacitive type, an infrared type, and a surface acoustic wave type. In addition to the touch panel 1331, the input unit 1330 may further include another input device 1332. Specifically, another input device 1332 may include, but is not limited to, one or more of a physical keyboard, a functional key (such as a volume control key or a switch key), a track ball, a mouse, and a joystick.

The display unit 1340 may be configured to display information inputted by the user or information provided for the user, and various menus of the mobile phone. The display unit 1340 may include a display panel 1341. In some embodiments, the display panel 1341 may be configured in the form of a liquid crystal display (LCD), an organic light-emitting diode (OLED), or the like. Further, the touch panel 1331 may cover the display panel 1341. After detecting a touch operation on or near the touch panel 1331, the touch panel 1331 transfers the touch operation to the processor 1380, to determine a type of a touch event. Then, the processor 1380 provides a corresponding visual output on the display panel 1341 according to the type of the touch event. Although in FIG. 14, the touch panel 1331 and the display panel 1341 are used as two separate parts to implement input and output functions of the mobile phone, in some embodiments, the touch panel 1331 and the display panel 1341 may be integrated to implement the input and output functions of the mobile phone.

The mobile phone may further include at least one sensor 1350 such as an optical sensor, a motion sensor, and other sensors. Specifically, the optical sensor may include an ambient light sensor and a proximity sensor. The ambient light sensor may adjust luminance of the display panel 1341 according to brightness of the ambient light. The proximity sensor may switch off the display panel 1341 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1360, a speaker 1361, and a microphone 1362 may provide audio interfaces between a user and the mobile phone. The audio circuit 1360 may convert received audio data into an electrical signal and transmit the electrical signal to the speaker 1361. The speaker 1361 converts the electrical signal into a sound signal for output. On the other hand, the microphone 1362 converts a collected sound signal into an electrical signal. The audio circuit 1360 receives the electrical signal, converts the electrical signal into audio data, and outputs the audio data to the processor 1380 for processing. Then, the processor 1380 sends the audio data to, for example, another mobile phone by using the RF circuit 1310, or outputs the audio data to the memory 1320 for further processing.

Wi-Fi is a short distance wireless transmission technology. The mobile phone may help, by using the Wi-Fi module 1370, a user to receive and transmit an email, browse a web page, access stream media, and the like. This provides wireless broadband Internet access for the user. Although FIG. 14 shows the Wi-Fi module 1370, it may be understood that the Wi-Fi module is not a necessary component of the mobile phone, and the Wi-Fi module may be omitted as required provided that the scope of the essence of the present disclosure is not changed.

The processor 1380 is a control center of the mobile phone, and is connected to various parts of the entire mobile phone by using various interfaces and lines. By running or executing a software program and/or module stored in the memory 1320, and invoking data stored in the memory 1320, the processor 1380 executes various functions of the mobile phone and performs data processing, thereby monitoring the entire mobile phone. In some embodiments, the processor 1380 may include one or more processing units. Preferably, the processor 1380 may integrate an application processor and a modem processor. The application processor mainly processes an operating system, a user interface, an application program, and the like. The modem processor mainly processes wireless communication. It may be understood that the modem processor may alternatively not be integrated into the processor 1380.

The mobile phone further includes the power supply 1390 (such as a battery) for supplying power to the components. Preferably, the power supply may be logically connected to the processor 1380 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment of this application, the processor 1380 included in the terminal further has the following functions:

transmitting a request to obtain parameter to a server, the request to obtain parameter carrying a reference face image;

receiving a recommended parameter set returned, according to the request to obtain parameter, by the server, the recommended parameter set being used for configuring parameters of a three-dimensional face model, first recommended coordinates being projected coordinates of a key facial point obtained by projecting the three-dimensional face model corresponding to the recommended parameter set onto a coordinate system in which reference coordinates are located, the reference coordinates being key point coordinates corresponding to a key facial point detected on the reference face image, proximity of the first recommended coordinates to the reference coordinates meeting a preset condition; and displaying the recommended parameter set of face parameters.

In some embodiments, the processor 1380 may further perform method steps of any specific implementation of the method for configuring parameters of a three-dimensional face model in the embodiments of this application.

Besides, this application further provides a device for configuring parameters of a three-dimensional face model. The device may be specifically a terminal device. The structure of the terminal device is similar to the structure of the parameter configuration device for a three-dimensional face model shown in FIG. 14. A processor therein is configured to perform the following steps:

obtaining a reference face image;

identifying a key facial point on the reference face image to obtain key point coordinates as reference coordinates; and determining a recommended parameter set of face parameters in a face parameter value space according to the reference coordinates, the recommended parameter set being used for configuring parameters of a three-dimensional face model;

first projected coordinates being projected coordinates of the key facial point obtained by projecting the three-dimensional face model corresponding to the recommended parameter set onto a coordinate system in which the reference coordinates are located, proximity of the first projected coordinates to the reference coordinates meeting a preset condition.

In some embodiments, the processor may further perform method steps of any specific implementation of the method for configuring parameters of a three-dimensional face model in the embodiments of this application.

An embodiment of this application further provides a computer-readable storage medium, configured to store program code, and the program code is used to perform any implementation in a method for configuring parameters of a three-dimensional face model described in the foregoing embodiments.

An embodiment of this application further provides a computer program product including instructions, the instructions, when run on a computer, causing the computer to perform any implementation in a method for configuring parameters of a three-dimensional face model described in the foregoing embodiments.

Those skilled in the art can clearly understand that for convenience and conciseness of description, the specific working processes of the above-described systems, devices and units can be understood with reference to the corresponding processes in the above-described method embodiments and will not be repeated here.

In the embodiments provided in this application, it is to be understood that the disclosed system, apparatus, and method may be implemented in other manners. The described apparatus embodiment is merely an example. For example, the unit division or a module is merely logical function division and may be other division in different implementations. For example, a plurality of units, modules, or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units or modules described as separate components may or may not be physically separated, and the components displayed as units may or may not be physical units, that is, may be located in one place or may be distributed over multiple network units. Some or all of the units or modules may be selected according to specific requirements to achieve the objectives of the solutions in the embodiments.

In addition, functional units or functional modules in the embodiments of this application may be integrated into one processing unit, or each of the units can exist alone physically, or two or more units are integrated into one unit. The integrated unit or module may be implemented in the form of hardware, or may be implemented in the form of a software functional unit or functional module.

When the integrated unit or module is implemented in the form of a software functional unit and sold or used as an independent product, the integrated unit may be stored in a computer-readable storage medium. Based on such an understanding, the technical solutions of this application essentially, or the part contributing to the fields of the technology, or the entire or some of the technical solutions may be implemented in the form of a software product. The computer software product is stored in a storage medium and includes several instructions for instructing a computer device (which may be a PC, a server, a network device, or the like) to perform all or some of the steps of the methods described in the embodiments of this application. The foregoing storage medium includes any medium that may store program code, such as a USB flash drive, a removable hard disk, a ROM, a RAM, a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A method for configuring parameters of a three-dimensional face model, applied to a server in communication with a user terminal, the method comprising:

obtaining a reference face image from the user terminal;

identifying a key facial point on the reference face image to obtain reference coordinates;

determining a recommended parameter set according to the reference coordinates, the recommended parameter set being used for configuring parameters of a three-dimensional face model;

projecting the three-dimensional face model corresponding to the recommended parameter set onto a coordinate system in which the reference coordinates are located, to obtain projected coordinates; and sending the recommended parameter set to the user terminal, in response to determining a distance between the projected coordinates and the reference coordinates meets a preset condition.

2. The method according to claim 1, wherein determining the recommended parameter set comprises:

grouping face parameters to obtain a plurality of parameter groups;

determining, for each of the plurality of parameter groups, a plurality of value combinations, and determining, in the plurality of value combinations, a value combination corresponding to projected coordinates closest to the reference coordinates, as a recommended value combination;

combining a plurality of recommended value combinations corresponding to the plurality of parameter groups to form a recommended value combination of face parameters;

and determining the recommended parameter set according to the recommended value combination of face parameters.

3. The method according to claim 2, wherein grouping the face parameters comprises:

grouping the face parameters according to degrees to which the face parameters affect the three-dimensional face model and correlation between the face parameters, to obtain the plurality of parameter groups.

4. The method according to claim 3, wherein grouping the face parameters comprises:

dividing the face parameter into the plurality of parameter groups according to correlation between the face parameters and a specified face region, the specified face region including at least one of a cheek, eyes, eyebrows, a mouth, and a nose.

5. The method according to claim 1, wherein determining the recommended parameter set of the face parameters comprises:

obtaining a plurality of value combinations formed by grouping the face parameters;

determining, for each of the plurality of value combinations, a distance between projected coordinates corresponding to the each of the plurality of value combinations and the reference coordinates; and determining the recommended parameter set according to the distance between projected coordinates corresponding to the each of the plurality of value combinations and the reference coordinates.

6. The method according to claim 1, wherein the distance between the projected coordinates and the reference coordinates is determined by:

determining a conversion parameter according to key facial point coordinates of a reference three-dimensional face model and the reference coordinates;

projecting the three-dimensional face model onto the coordinate system according to the conversion parameter to obtain the second projected coordinates; and determining a modulus value of a vector difference between the second projected coordinates and the reference coordinates as the distance between the second projected coordinates and the reference coordinates.

7. The method according to claim 1, wherein determining the recommended parameter set comprises:

determining whether the distance is less than a preset proximity threshold, and determining the recommended value combination of the face parameters as the recommended parameter set in response to that the distance is less than the preset proximity threshold; or determining whether the distance is in a convergence state, and determining the recommended value combination of the face parameters as the recommended parameter set in response to that the distance is in the convergence state.

8. The method according to claim 7, further comprising:

updating the reference three-dimensional face model according to the recommended value combination of the face parameters in response to that the distance is neither less than the preset proximity threshold nor in the convergence state.

9. The method according claim 1, further comprising:

generating a virtual face model according to the recommended parameter set.

10. A method for configuring parameters of a three-dimensional face model, applied to a terminal, the method comprising:

transmitting a request to obtain parameter to a server, the request to obtain parameter carrying a reference face image;

receiving a recommended parameter set returned, according to the request to obtain parameter, by the server, the recommended parameter set being used for configuring parameters of a three-dimensional face model, the recommended coordinates being projected coordinates obtained by projecting the three-dimensional face model onto a coordinate system in which reference coordinates are located; and receiving the recommended parameter set of the face parameters from the server, in response to determining by the server that a distance between the projected coordinates and the reference coordinates meets a preset condition.

11. The method according to claim 10, further comprising:

displaying the recommended parameter set on a virtual character configuration interface, the virtual character configuration interface further displaying an adjustment control corresponding to the face parameters.

12. An apparatus including a server for configuring parameters of a three-dimensional face model, the server being in communication with a user terminal, the server comprising: a memory storing computer program instructions; and a processor coupled to the memory and configured to execute the computer program instructions and perform:

obtaining a reference face image from the user terminal;

identifying a key facial point on the reference face image to obtain reference coordinates;

determining a recommended parameter set according to the reference coordinates, the recommended parameter set being used for configuring parameters of a three-dimensional face model;

projecting the three-dimensional face model corresponding to the recommended parameter set onto a coordinate system in which the reference coordinates are located, to obtain projected coordinates; and sending the recommended parameter set to the user terminal, in response to determining a distance between the projected coordinates the reference coordinates meets a preset condition.

13. The apparatus according to claim 12, wherein determining the recommended parameter set includes:

grouping face parameters to obtain a plurality of parameter groups;

determining, for each of the plurality of parameter groups, a plurality of value combinations, and determining, in the plurality of value combinations, a value combination corresponding to projected coordinates closest to the reference coordinates, as a recommended value combination;

combining a plurality of recommended value combinations corresponding to the plurality of parameter groups to form a recommended value combination of face parameters; and determining the recommended parameter set according to the recommended value combination of the face parameters.

14. The apparatus according to claim 13, wherein grouping the face parameters includes:

grouping the face parameters according to degrees to which the face parameters affect the three-dimensional face model and correlation between the face parameters, to obtain the plurality of parameter groups.

15. The apparatus according to claim 14, wherein grouping the face parameters includes:

dividing the face parameter into the plurality of parameter groups according to correlation between the face parameters and a specified face region, the specified face region including at least one of a cheek, eyes, eyebrows, a mouth, and a nose.

16. The apparatus according to claim 12, wherein determining the recommended parameter set of the face parameters includes:

obtaining a plurality of value combinations formed by combining grouping the face parameters;

determining, for each of the plurality of value combinations, a distance between projected coordinates corresponding to the each of the plurality of value combinations and the reference coordinates; and determining the recommended parameter set according to the distance between projected coordinates corresponding to the each of the plurality of value combinations and the reference coordinates.

17. The apparatus according to claim 12, wherein the distance between the projected coordinates and the reference coordinates is determined by:

determining a conversion parameter according to key facial point coordinates of a reference three-dimensional face model and the reference coordinates;

projecting the three-dimensional face model onto the coordinate system according to the conversion parameter to obtain the second projected coordinates; and determining a modulus value of a vector difference between the second projected coordinates and the reference coordinates as the distance between the second projected coordinates and the reference coordinates.

18. The apparatus according to claim 12, wherein determining the recommended parameter set includes:

determining whether the distance is less than a preset proximity threshold, and determine the recommended value combination of the face parameters as the recommended parameter set in response to that the distance is less than the preset proximity threshold; or determining whether the distance is in a convergence state, and determine the recommended value combination of the face parameters as the recommended parameter set in response to that the distance is in the convergence state.

19. The apparatus according to claim 18, wherein the processor is further configured to execute the computer program instructions and perform:

updating the reference three-dimensional face model according to the recommended value combination of the face parameters in response to that the distance is neither less than the preset proximity threshold nor in the convergence state.

20. A non-transitory computer readable storage medium storing computer instructions that, when being executed by a processor of a server in communication with a user terminal, cause the processor to perform:

obtaining a reference face image from the user terminal;

identifying a key facial point on the reference face image to obtain reference coordinates;

determining a recommended parameter according to the reference coordinates, the recommended parameter set being used for configuring parameters of a three-dimensional face model:

projecting the three-dimensional face model corresponding to the recommended parameter set onto a coordinate system in which the reference coordinates are located, to obtain projected coordinates; and sending the recommended parameter set to the user terminal, in response to determining a distance between the projected coordinates and the reference coordinates meets a preset condition.

* * * * *